April 17, 1962 C. L. RANDOLPH ETAL 3,030,174
METHOD FOR PREPARING BORAZOLES
Filed Nov. 9, 1959
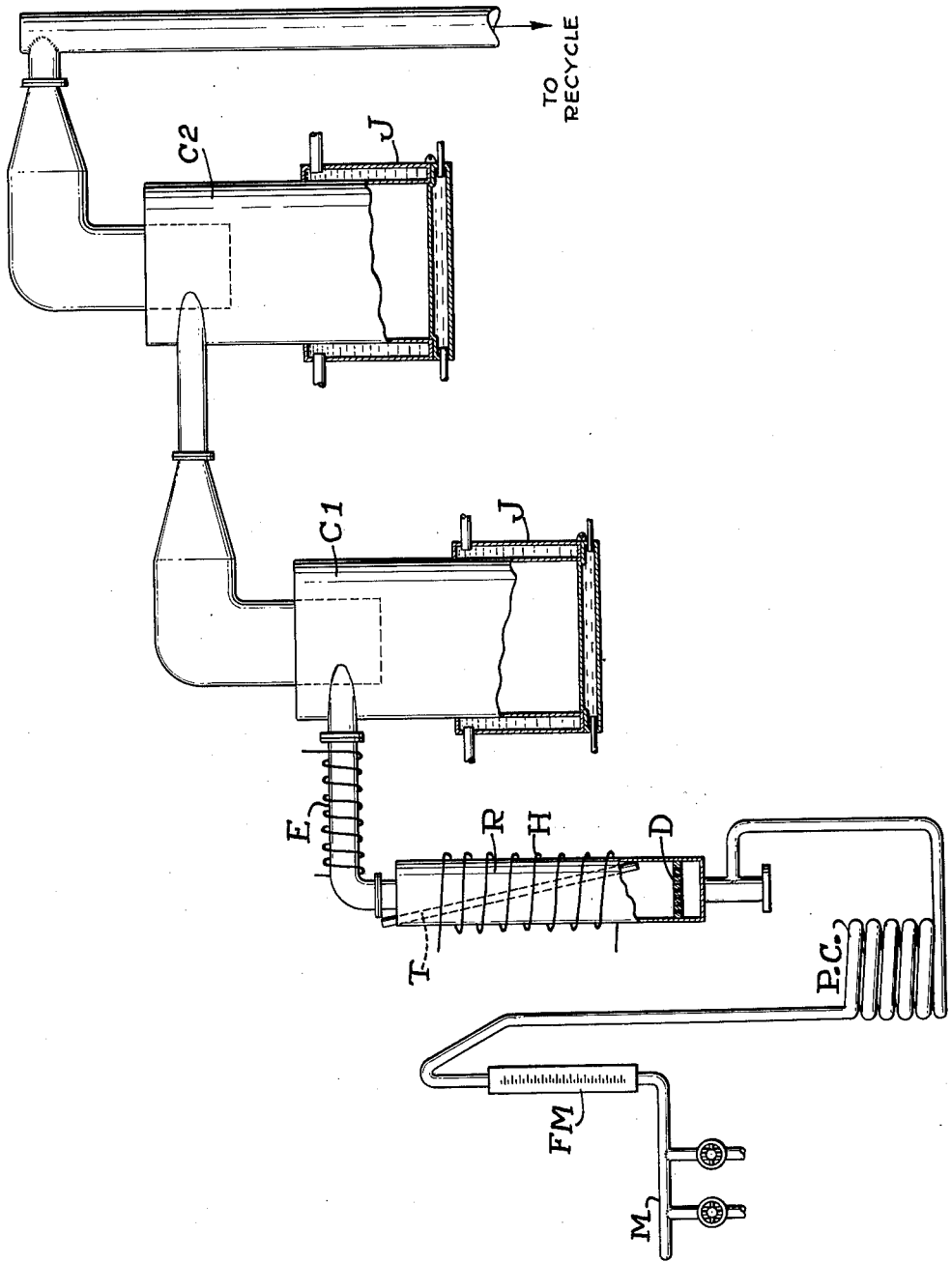
INVENTORS
CARL L. RANDOLPH
JOSEPH G. BOWER
BY
*Ett Foela*
AGENT

United States Patent Office 3,030,174
Patented Apr. 17, 1962

3,030,174
METHOD FOR PREPARING BORAZOLES
Carl L. Randolph, La Habra, and Joseph G. Bower, Orange, Calif., assignors to United States Borax & Chemical Corporation, Los Angeles, Calif., a corporation of Nevada
Filed Nov. 9, 1959, Ser. No. 851,915
4 Claims. (Cl. 23—14)

The present invention is a continuation-in-part application of our application bearing Serial Number 762,529, filed September 22, 1958, now abandoned.

This invention relates as indicated to a method for preparing borazoles and has more particular reference to a new method for preparing B-trichloroborazole.

B-trichloroborazole has long been recognized as a desirable reagent for the preparation of a large number of borazole derivatives, including borazole itself, and due to its polyfunctionality it is also considered a most excellent starting material for the synthesis of high-stability inorganic polymers. However, in spite of its many desirable properties B-trichloroborazole has more or less remained a laboratory curiosity since the prior art methods for producing the material were so inefficient as to make the compound economically unfeasible.

It is therefore the principal object of this invention to provide a new and novel method for making B-trichloroborazole.

It is a further object of this invention to provide a method for the preparation of B-trichloroborazole, which method is so efficient as to make B-trichloroborazole widely economically available.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing B-trichloroborazole which comprises fluidizing a bed of particulate solids with a substantially anhydrous gas, said bed comprising an admixture of from about 10 to about 50% of a material selected from the class consisting of ammonium chloride, ammonium bromide, ammonium fluoride, ammonium sulfate and ammonium orthophosphate, and from about 90 to about 50% of a particulate solid inert to the reaction, simultaneously heating said bed to a temperature range of from about 120 to about 350° C. until the bed becomes substantially anhydrous, charging the bed with substantially anhydrous boron trichloride to react with the said ammonium salt in the fluidized bed and condensing the resultant B-trichloroborazole in a substantially anhydrous atmosphere.

From the foregoing broadly stated paragraph it will be seen that the present method uses a fluid bed, and that the bed itself comprises one of the ingredients of the reaction. Further it is to be completely understood in the specification and appended claims that the bed can be fluidized by dry gaseous boron trichloride as well as any of the other dry gases enumerated below. If boron trichloride is used as the fluidizing gas then, of course, it is only necessary to continue the flow of boron trichloride when the bed reaches reaction temperature. If another gas is used as the fluidizing gas then, of course, it becomes necessary to use boron trichloride at the reaction temperature so that the B-trichloroborazole is formed. Still further if a gas other than boron trichloride is used to fluidize the bed it is not necessary to completely discontinue such gas when the boron trichloride is introduced into the system. The amount of boron trichloride used, from a small amount up to 100% of the incoming gases, is predetermined by the operator. Thus, the operator can control the speed of product formation by being able to control the amount of incoming boron trichloride and the reaction temperature. As for the reaction temperature we have found that B-trichloroborazole will form in a range of from about 120° C. to about 350° C. In the preferred embodiment of our invention we use a temperature of about 160° C. Thus, it is immaterial what gas is used to fluidize the bed as long as the gas is substantially completely moisture-free and if the gas is other than $BCl_3$ then the gas must be nonreactive with the enumerated ammonium salts and the boron trichloride. Therefore, such gases as dry boron trichloride, dry oxygen, dry nitrogen, dry air, dry argon, dry carbon monoxide, dry carbon dioxide and dry hydrogen chloride are all equally usable in the present invention to fluidize the bed of ammonium salts and inert material.

The attached drawing is a diagrammatic representation of an apparatus for practicing the method of the present invention. The gases enter the system through manifold M and flowmeter FM which controls the rate of flow of the gases. The gases pass through preheating coil PC where they are heated substantially to the temperature of the bed and then into the reactor R. The reactor R is fitted with a distributor plate D to support the bed of ammonium chloride. The distributor plate D has a number of small holes which allows passage of the gases and at the same time prevents the small particles from the bed from falling into and clogging the bottom of the reactor where the gases are introduced. The reactor R is heated as by electric furnace H and the top of the reactor R is provided with a thermocouple well T and a heated exit tube E. The exit tube E is heated to prevent condensation and deposition of the product in the exit tube and thus prevent clogging. The product is collected in condensing chambers C1 and C2, which are cooled as by water jackets J. The chambers C1 and C2 are designed to provide a maximum condensing surface for the product from the exhausting gases and in effect act as cyclones which allow a large volume of gas with a low velocity. Thus the product condenses, falls to the bottom of the condensing chambers C1 and C2 and the exhausting gases having a low velocity tend to carry over a minimum of product. Any excess boron trichloride leaving chamber C2 can be recycled back into the system if desired.

Using the foregoing apparatus a typical preparation of trichloroborazole is carried out as follows:

Dry nitrogen is passed through the system to flush out any moist air. While the nitrogen is still flowing, a bed comprising about 50% ammonium chloride and 50% petroleum coke is discharged into the reactor through an opening provided in the top. As the nitrogen is increased to fluidizing velocity, it is preheated by passing through the preheater coil, while at the same time heat is applied to the reactor. When the reactor reaches about 160° C. the boron trichloride is also admitted to the reactor through the preheater coil. As the reaction proceeds, less nitrogen is used as the bed becomes less dense and the boron trichloride sustains the fluidizing of the bed. When the temperature rises sharply the reaction is stopped by stopping the flow of boron trichloride. The bed is kept fluid with the nitrogen to sweep out residual hydrogen chloride and boron trichloride and to accelerate cooling. The trichloroborazole is collected from the condensing chambers from a discharge opening provided in the bottom. Care must be used to exclude the surrounding atmosphere while removing the product as it hydrolyzes readily releasing large volumes of hydrogen chloride.

Using the foregoing method we have obtained yields of 80% and better of trichloroborazole. Such yields are approximately twice those of the best prior art methods.

The above method discloses a bed comprising about 50% ammonium chloride and 50% petroleum coke. However, it is to be clearly understood that any of the other enumerated ammonium salts can be used equally well, and further examples disclosing the use of the other ammonium slats would be redundant since the results would be substantially identical. As disclosed in the foregoing discussion the bed comprises an admixture of an ammonium salt, one of the reactants, and a particulate solid material which is inert to the reaction. We have found that the addition of the inert material enhances the agitation of the fluidized bed, keeps the bed at a fairly consistent bulk density which makes the fluidization relatively simple and aids in keeping the ammonium salt from agglomerating, and thus results in increased yields. Materials such as magnesium turnings, flakes or beads of glass, tower packings, silica sand, zircon sand, petroleum coke or any other material which is inert to the reaction can be used to cause enhanced agitation, decrease the tendency of the ammonium salt to agglomerate and control the bulk density of the bed. For best results, a bed comprising from about 10–50% ammonium salt and from about 90–50% inert material is used.

Attention is also directed to the fact that while it is not necessary to the operation of the present process to preheat the gases entering the reactor, we have found the reaction to be more efficient and result in higher yields when the gases are preheated. Thus in the preferred embodiment of our invention we preheat the gases entering the reactor.

Other modes of applying the principle of the invention may be employed, change being made as regards the details described, provided the features stated in any of the following claims or the equivalent of such be employed.

We, therefore, particularly point out and distinctly claim as our invention:

1. The method of producing B-trichloroborazole which comprises fluidizing a bed of particulate soldis with a substantially anhydrous gas, said bed comprising an admixture of from about 10 to about 50% of a material selected from the class consisting of ammonium chloride, ammonium bromide, ammonium fluoride, ammonium sulfate, and ammonium orthophosphate, and from about 90 to about 50% of a particulate solid inert to the reaction, simultaneously heating said bed to a temperature range of from about 120 to about 350° C. until the bed becomes substantially anhydrous, charging the bed with substantially anhydrous boron trichloride to react with the said ammonium salt in the fluidized bed and condensing the resultant B-trichloroborazole in a substantially anhydrous atmosphere.

2. The method of claim 1 wherein the fluidizing gas and boron trichloride are preheated substantially to the same temperature as said fluidized bed.

3. The method of claim 1 wherein the inert solid of said bed is particulate petroleum coke.

4. The method of claim 1 wherein the ammonium salt is ammonium chloride.

References Cited in the file of this patent
UNITED STATES PATENTS 2,758,021   Drapeau et al. _____ Aug. 7, 1956

OTHER REFERENCES

Schaefer et al.: "Journal of the American Chemical Society," vol. 76, pages 3303–3306 (June 20, 1954).

Laubengayer et al.: "Abstracts of Papers Presented at the September Meeting of the American Chemical Society," page 10P (1949).